United States Patent
Huang

(10) Patent No.: US 10,406,479 B2
(45) Date of Patent: Sep. 10, 2019

(54) METHOD AND APPARATUS FOR REMOVING NITROGEN OXIDES FROM GAS STREAMS

(71) Applicant: Liwei Huang, Hangzhou (CN)

(72) Inventor: Liwei Huang, Hangzhou (CN)

(73) Assignee: Liwei Huang, Hangzhou (CN)

( * ) Notice: Subject to any disclaimer, the term of this patent is extended or adjusted under 35 U.S.C. 154(b) by 0 days.

(21) Appl. No.: 15/555,704

(22) PCT Filed: Jun. 29, 2016

(86) PCT No.: PCT/CN2016/087622
§ 371 (c)(1),
(2) Date: Oct. 8, 2018

(87) PCT Pub. No.: WO2017/000879
PCT Pub. Date: Jan. 5, 2017

(65) Prior Publication Data
US 2019/0060829 A1    Feb. 28, 2019

(30) Foreign Application Priority Data

Jul. 2, 2015 (CN) .......................... 2015 1 0393991

(51) Int. Cl.
*B01D 53/56* (2006.01)
*B01D 53/82* (2006.01)
*B01D 53/83* (2006.01)

(52) U.S. Cl.
CPC ........... *B01D 53/565* (2013.01); *B01D 53/56* (2013.01); *B01D 53/82* (2013.01); *B01D 53/83* (2013.01); *B01D 2251/60* (2013.01); *B01D 2253/112* (2013.01); *B01D 2255/20738* (2013.01); *B01D 2257/404* (2013.01)

(58) Field of Classification Search
CPC ........ B01D 53/56; B01D 53/82; B01D 53/83; B01D 2255/20738; B01D 53/565; B01D 2251/60; B01D 2253/112; B01D 2257/404; B01D 2258/0283; B01J 8/00; B01J 19/00; B01J 27/10; B01J 27/128; B01J 27/1853; B01J 2208/00; B01J 2208/00796
See application file for complete search history.

(56) References Cited

U.S. PATENT DOCUMENTS

| | | | |
|---|---|---|---|
| 5,382,418 A | 1/1995 | Thöne et al. | |
| 7,476,364 B2 | 1/2009 | Peng et al. | |
| 8,257,471 B2 | 9/2012 | Kanazawa et al. | |
| 8,512,659 B2 * | 8/2013 | Li | B01D 53/8628 423/213.5 |
| 2008/0279740 A1 * | 11/2008 | Augustine | B01D 53/9418 423/239.1 |
| 2009/0048095 A1 * | 2/2009 | Li | B01D 53/8628 502/74 |
| 2009/0318284 A1 * | 12/2009 | Kanazawa | B01D 53/02 502/74 |
| 2015/0343425 A1 | 12/2015 | Ibe et al. | |

FOREIGN PATENT DOCUMENTS

| | | |
|---|---|---|
| CN | 104353347 | 2/2015 |
| CN | 105413448 | 3/2016 |
| CN | 105536500 | 5/2016 |
| CN | 105536503 | 5/2016 |
| CN | 105664709 | 6/2016 |

OTHER PUBLICATIONS

International Search Report for Application No. PCT/CN2016/087622 dated Oct. 8, 2016.

* cited by examiner

*Primary Examiner* — Timothy C Vanoy
(74) *Attorney, Agent, or Firm* — Carlson, Gaskey & Olds, P.C.

(57) ABSTRACT

A method and apparatus for removing nitrogen oxides from gas streams, includes introducing a to-be treated gas stream into a gas-solid reaction column, and introducing ferric chloride solid particles into the gas-solid reaction tower at the same time. The nitrogen oxides in the gas streams undergo gas-solid chemical adsorption reaction with the ferric chloride solid particles to form solid products and are removed, and thereby purifying the gas.

10 Claims, 2 Drawing Sheets

METHOD AND APPARATUS FOR REMOVING NITROGEN OXIDES FROM GAS STREAMS

BACKGROUND OF THE INVENTION

Human activities produce a large amount of nitrogen oxides ($NO_x$) mainly including NO and $NO_2$, of which 90% are produced by fossil fuel combustion, followed by nitric acid manufacturing process, nitrification of chemical and pharmaceutical industries, metal surface and semiconductor treatment processes. $NO_x$ has a toxic effect on humans, and the emission of a large amount of nitrogen oxides is one of the main causes of atmospheric photochemical smokes and acid rains. China statistical yearbook on environment (2010) showed that the contribution of nitrogen oxides to China's urban acid rain increased in some regions. Therefore much more stringent laws and regulations on the emissions of nitrogen oxides have been enacted, especially for the emissions from thermal power plant and other fossil combustion processes.

In general, the concentration of nitrogen oxides in exhaust gases from fossil fuel combustion, such as at thermal power plants, is about several hundred to several thousand parts per million (ppm), of which more than 95% is nitric oxide (NO). At present, selective catalytic reduction (SCR) is one of the major methods to remove $NO_x$ from flue gas. But the catalyst works at strict operating conditions, and ammonia is needed as the reducing agent. When the flue gases contain sulfides and dusts, the catalyst may be degraded for a period of operation. Operation of coal-fueled thermal power plants results in particularly high SCR system operating costs. The main method for emission source purification at low temperatures is a wet method using a variety of liquids to absorb $NO_x$ from gas stream. There are two kinds of oxidation absorption and reduction absorption for $NO_x$ removal. An oxidation method is the use of hydrogen peroxide, sodium hypochlorite and potassium permanganate as an oxidant. A reduction method is the use of sodium sulfite, sodium sulfide and urea as a reducing agent. However, when the flue gas contains much more nitric oxide, due to the low solubility of nitric oxide in solution, the removal efficiency is low, and the operating costs are also high due to the consumption of expensive reactants. Therefore a new nitrogen oxide purification technology is desired.

FIELD OF TECHNOLOGY

The present disclosure relates to a method and device for removing nitrogen oxides from gas streams and belongs to the technical field of air pollution control and related environmental protection.

CROSS-REFERENCE TO RELATED APPLICATION

This application claims priority to PCT Application No. PCT/CN2016/087622 having a filing date of Jun. 29, 2016, based off of CN application NO. 201510393991.9 having a filing date of Jul. 2, 2015, the entire contents of which are hereby incorporated by reference.

SUMMARY OF THE INVENTION

The technical scheme described in this disclosure comprises the following steps: a method for removing nitrogen oxides from a gas stream, characterized in that the to-be processed gas stream is introduced into a gas-solid reaction column and at the same time ferric chloride solid particle is added into the gas-solid reaction column, and then in the gas-solid reaction column nitrogen oxides from the gas stream are absorbed by ferric chloride particles due to gas-solid reaction between nitrogen oxides and ferric chloride to form solid products, so as to achieve gas purification.

The nitrogen oxides include nitrogen oxide and nitrogen dioxide, mainly nitrogen oxide. The solid product of the gas-solid adsorption reaction of nitrogen oxides and ferric chloride includes coordination compounds of ferric chloride and nitrogen oxides or related salts.

The exhaust gases according primarily include nitrogen oxide-containing flue gases from fossil fuel combustion such as thermal power generation and smelting processes, and other related processes or from other industrial processes. The concentration of nitrogen oxides in the fuel combustion flue gas is generally below 1% by volume and the concentration of nitrogen oxides in other industrial exhaust gases may be higher than 1% by volume.

The gas-solid reaction column as a gas-solid direct contact reactor can be used in the form of a fixed bed, a moving bed, an ebullated bed, a fluidized bed and a circulating fluidized bed reactor, which are commonly used in chemical processes, and the flow of gas and solid particle in the column can be arranged in the way of entrain flow, counterflow, cross flow and other flow forms. The effect of the above arrangements is roughly the same. For more details of the reactor structure, the relevant chemical reaction equipment manuals may be consulted.

In the case of using a circulating fluidized bed reaction column as the gas-solid reactor, the lower side of the column is provided with a gas inlet connecting to the to-be treated gas stream, and a solid addition port is provided at the middle of the column for the addition of the solid powder of ferric chloride into the column. The adding of the ferric chloride solid particles can be carried out by mechanical feeding or pneumatic feeding system, and the effect is quite the same. A gas flow distributor is arranged above the gas inlet in the column, and the upper side of the column is provided with a connecting pipe to a gas-solid separator. The cleaned gas is discharged from the upper part of the gas-solid separator, and the solid particles are discharged from the lower part of the gas-solid separator. Part of the solid particles may return to the reaction column for the unreacted ferric chloride participating in the reaction again, and the proportion of the solid particle returning to the column can be adjusted from the range of 0 to 100%.

The reaction temperature range in the gas-solid reaction column is generally in the range of 35° C. to 95° C., and the temperature may be appropriately lower at negative pressure in the column, and the temperature in the column may be higher at higher pressure. The priority temperature range is from 40° C. to 75° C. If the temperature of the ferric chloride solid particles is preheated to 40° C. or higher (in the range of 50° C. to 95° C.) and then are added to the gas-solid reaction column, the temperature of the gas stream introduced into the reaction column can be lower than 35° C. This is because the ferric chloride is activated by preheating, so that the gas-solid reaction temperature between nitrogen oxides and ferric chloride may decrease correspondingly. The gas-solid reaction of ferric chloride and nitrogen oxides is an exothermic reaction. The gas-solid contact time in the reactor is generally from 0.5 s-100 s. The removal of $NO_x$ increased with the increase of gas-solid contact time, preferably 1 s-25 s. The stoichiometric ratio of the reaction of the ferric chloride and nitrogen oxides may be assumed to be 1.

In an actual operation process, the dosage of ferric chloride added to the column can be determined according to the type of reaction column, the iron chloride particle size, gas stream temperature, gas residence time, predetermined conversion rate and other operating parameters. For the circulating fluidized bed gas-solid reaction column, the molar ratio of ferric chloride and nitrogen oxide is generally set from 0.5-100. The greater the molar ratio, the higher the removal of $NO_x$. The priority of the molar ratio is 5-30, depending on specific operation conditions. For fixed bed, moving bed, fluidized bed and fluidized bed, there are no specific molar ratio requirements for ferric chloride.

The ferric chloride solid particles are generally powdered product and can be of commercial product. The average particle size of commercial product is generally from 0.01 mm to 1 mm, and the particle size is preferably small. In order to improve the gas-solid reaction efficiency in the reaction column, a mixture of quartz sand, ceramic or zeolite and other granular fillers and ferric chloride powder can also be used by a certain proportion into the gas-solid reaction column. The particle sizes of these granular fillers are generally from 0.01 mm to 10 mm, and the mixing ratio is up to 99% by volume in the mixture. The mixing ratio can be determined according to the reaction column and the operating parameters. The mixing ratio in a fluidized bed reaction column may be, in some examples, 5% to 30%, and in the fixed bed reaction column the mixing ratio may be higher, preferably 30-60%. For example, in a fixed bed gas-solid reaction column mixed 50% (volume ratio) of the particle size of about 2 mm-5 mm quartz sand, the reaction efficiency of ferric chloride and nitrogen oxides can be improved more than 20%. The presence of oxygen and moisture in the gas stream has little effect on the removal of nitrogen oxides, and the reaction process may produce a small amount of hydrogen chloride gas which can be removed by subsequent solid or liquid absorption.

The absorbed nitrogen oxides in solid product after the reaction can be released by heating, and the heating temperature is generally 105° C. or higher, preferably 150° C. to 250° C. under normal pressure, and may be lower at negative pressure. When the solid product is heated to 300° C. or above with the presence of oxygen, an iron oxide by-product can be obtained. The desorbed nitrogen oxides may be used to make nitric acid. The solid product may be also dissolved in a solvent such as water to release the absorbed nitrogen oxide, and furthermore the iron oxide by-product may be recovered. The solid products can also be used to regenerate ferric chloride and can be recycled as the chemical sorbent.

Compared with prior art, this invention has the advantages that using ferric chloride as a solid sorbent reacts with nitrogen oxides in gas stream at a certain temperature range to a solid product, so as to achieve the purpose of gas purification. The solid product can be further treated to produce the by-products, such as nitric acid or iron oxide after releasing the absorbed nitrogen oxides.

DETAILED DESCRIPTION

Figure 1:
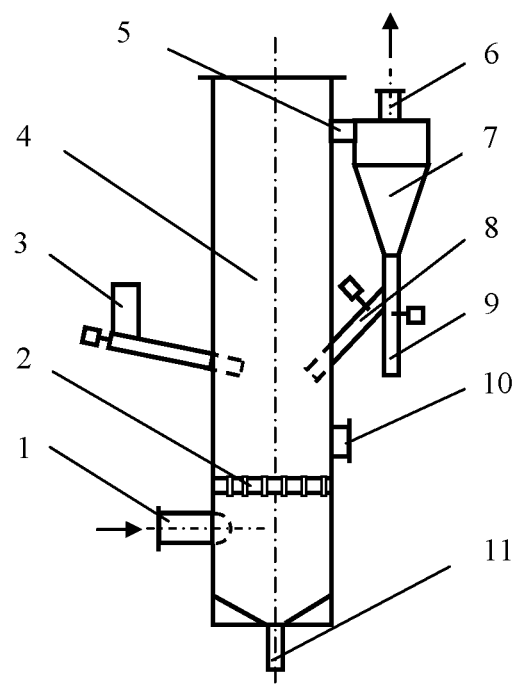
FIG. 1 a schematic structural view of a gas-solid reaction column apparatus according to Example 1-3 of the present disclosure.

An apparatus for removing nitrogen oxides from a gas stream is shown in FIG. 1. The apparatus includes a column body 4, and the lower part of the column body 4 is provided with a gas inlet 1 for gas flow. A gas flow distributor 2 is arranged above the lower gas inlet of the column body 4, and the middle part of the column is provided with a solid particle inlet 3. The upper side of the column 4 is provided with a connecting pipe 5 to a gas-solid separator 7, and the upper part of the gas-solid separator 7 is provided a gas outlet 6, and the lower portion of the gas-solid separator 7 is provided with a solid particle discharge port 9, and the solid particle return port 8 connects to the column body 4, and the lower portion and the bottom portion of the column body 4 are provided with an inspection port 10 and a bottom solid particle discharge port 11, respectively.

According to an apparatus for removing nitrogen oxides from a gas stream as shown in FIG. 1, the treatment process is carried out by introducing the gas stream from the gas inlet 1 into the column body 4 through the gas distributor 2 and the ferric chloride solid powder into the column body 4 through the solid particle inlet 3 as well. With the mixing of gas and solid particles in the column, the gas-solid adsorption chemical reaction takes place, and $NO_x$ in the gas stream is absorbed by the ferric chloride solid particles, and then the mixture of gas and solid products are led into the gas-solid separator 7 through the connecting pipe 5 at the upper part of the column for gas-solid separation, and then the cleaned gas stream is discharged from the gas outlet 6, and a part of unreacted solid particles discharged from gas-solid separator 7 may be fed back to the column body 4 through the solid particle return port 8 to participate in the gas-solid reaction again and the remaining part of the solid products may be discharged through the solid particle discharge port 9. A bottom solid particle discharge port 11 is also provided for discharging excess solid particles in the column.

EXAMPLE 1

A circulating fluidized bed gas-solid reaction column apparatus for the removal of nitrogen oxides from a gas stream is shown in FIG. 1. The dimension of the circulating fluidized bed gas-solid reaction column is Φ60 mm×2500 mm, using 316L stainless steel as the material. The gas stream is composed of oxygen about 8% by volume, moisture about 10% by volume, nitrogen oxides (containing about 95% NO) 500 ppm, and the balance is nitrogen gas. The solid reactant of ferric chloride used is a commercial grade powder (the content≥98%), and the average particle size is about 0.1 mm. The temperatures of gas stream introduced to the column are adjusted to 35° C., 45° C., 65° C., 80° C. and 95° C., respectively. The gas flow rate is about 5 m³/h, and the gas-solid contact time in the reaction column is estimated from about 0.5 s-5 s. The molar ratio of nitrogen oxides to ferric chloride is about 1:15 with a solid powder weighing and screw feeding system. The solid particles after reaction are not sent back to the column after gas-solid separation by the gas-solid separator (using a cyclone separator). The experimental results are shown in table 1.

TABLE 1

Removal of nitrogen oxides

| | Items | |
|---|---|---|
| Temperature | Inlet $NO_x$ concentration (ppm) | Outlet $NO_x$ concentration (ppm) |
| 35° C. | 500 | 410 |
| 45° C. | 500 | 51 |
| 65° C. | 500 | 45 |
| 80° C. | 500 | 91 |
| 95° C. | 500 | 320 |

EXAMPLE 2

The concentration of NO in the gas stream is 500 ppm, and the temperature of the gas stream is 40° C., 55° C. and 75° C., respectively, and the molar ratio of nitrogen oxide to ferric chloride is 1:30. The other operation conditions are the same as in example 1. The experimental results are shown in table 2.

TABLE 2

Removal of nitrogen oxide

| | Items | |
|---|---|---|
| Temperature | Inlet NO concentration (ppm) | Outlet NO concentration (ppm) |
| 40° C. | 500 | 58 |
| 55° C. | 500 | 46 |
| 75° C. | 500 | 79 |

EXAMPLE 3

A mixture of 20% by volume of quartz sand having an average particle size of about 1 mm was mixed with ferric chloride powder, and a molar ratio of nitrogen oxides to ferric chloride is about 1:10, and the temperature of gas stream is 40° C., 55° C. and 75° C., respectively. Other conditions are the same as in example 1. The experimental results are shown in table 3.

TABLE 3

Removal of nitrogen oxides

| | Items | |
|---|---|---|
| Temperature | Inlet $NO_x$ concentration (ppm) | Outlet $NO_x$ concentration (ppm) |
| 40° C. | 500 | 41 |
| 55° C. | 500 | 33 |
| 75° C. | 500 | 65 |

EXAMPLE 4

Figure 2:
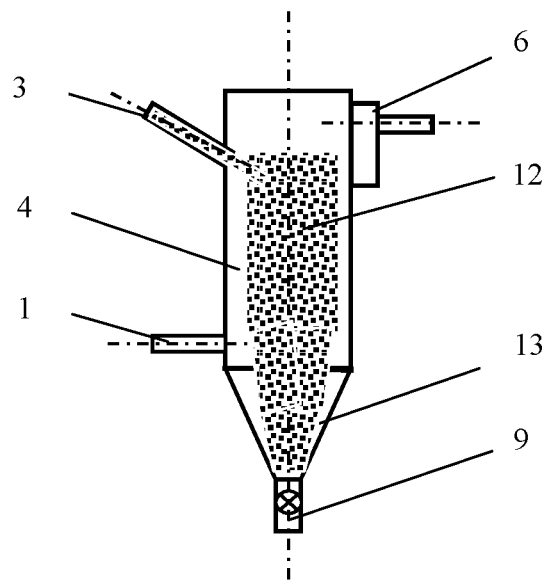
FIG. 2 a schematic structural view of a gas-solid reaction column apparatus according to Example 4-5 of the present disclosure.

A gas-solid counter-flow moving bed reaction column apparatus for removing nitrogen oxides from a gas stream is shown in FIG. 2.

The device comprises a column body 4, and the lower part of the column body 4 is provided with a gas inlet 1, and the upper part is provided with a solid particle inlet 3 and a gas outlet 6, and the bottom is provided with a solid particle discharge port 9. The gas inlet 1 communicates with the gas outlet 6 through the gas-solid reaction zone 12, and the solid particle inlet 3 communicates with the solid particle discharge port 9 through the gas-solid reaction zone 12 and the solid particle recovery zone 13, sequentially in the column body 4.

The column body has a diameter of Φ60 mm, a height of 1500 mm, using the material of 316L stainless steel. The effective height of the gas-solid reaction zone is about 1000 mm. The carrier gas is air with a relative humidity about 70%, and the concentration of nitrogen oxide in the gas stream is 500 ppm. The solid sorbent of ferric chloride used in the experiment is a commercial grade powder (the content≥98%), with an average particle size of about 0.1 mm. The temperatures of the gas stream introduced into the column are 40° C., 55° C. and 75° C., respectively, and the average gas flow of the gas stream is about 1 m³/h, with a gas-solid contact time of about 10 s-15 s in reaction column. The molar ratio of nitrogen oxide to ferric chloride is about 1:30.

The treatment process is carried out by introducing the gas stream from the gas inlet 1 into the column body 4 and the ferric chloride solid particles into the column body 4 through the solid particle inlet 3 as well. With the mixing of gas and solid particle in the gas-solid reaction zone 12 of the column, the gas-solid adsorption chemical reaction between $NO_x$ and ferric chloride takes place, and $NO_x$ in the gas stream is absorbed by the ferric chloride solid particles. The purified gas is then discharged from gas outlet 6, and the solid particles after the reaction are discharged through the solid particle discharge port 9. The experimental results are shown in table 4.

TABLE 4

Removal of nitrogen oxide

| | Items | |
|---|---|---|
| Temperature | Inlet NO concentration (ppm) | Outlet NO concentration (ppm) |
| 40° C. | 500 | 38 |
| 55° C. | 500 | 31 |
| 75° C. | 500 | 63 |

EXAMPLE 5

A gas-solid counter-flow moving bed reaction column apparatus for removing nitrogen oxides from a gas stream is shown in FIG. 2. The ferric chloride powder was preheated to 40° C., 50° C., 80° C. and 95° C. before being added to the gas-solid reaction column, and the temperature of the gas stream introduced into the reaction column was about 25° C., and the other conditions are the same as those in examples 4. Experimental results showed that outlet NO concentrations in gas stream were 365 ppm, 273 ppm, 85 ppm and 48 ppm, respectively.

EXAMPLE 6

Figure 3:
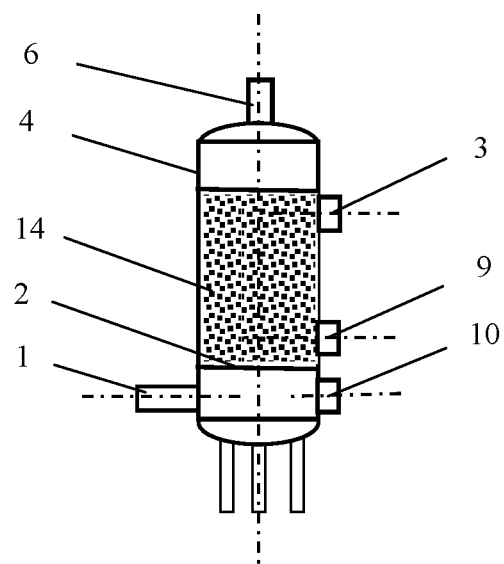
FIG. 3 a schematic structural view of a gas-solid reaction column apparatus according to Example 6 of the present disclosure.

A fixed bed gas-solid reaction column apparatus for removing nitrogen oxides from a gas stream is shown in FIG. 3.

The device comprises a column body 4, a gas inlet 1 which is arranged at the lower part of the column body 4, a gas flow distributor 2 which is arranged above the gas inlet 1 in the column, a ferric chloride filling layer 14 which is arranged above the gas flow distributor 2, and a solid particle inlet port 3 above the ferric chloride filling layer 14, a solid particle discharge port 9, an inspection port 10, and a gas outlet 6 at the upper port of the column body 4. The gas inlet 1 communicates with the gas outlet 6 through the air flow distributor 2 and the void of ferric chloride filling layer 14, sequentially. The solid particle inlet port 3 and the solid particle discharge port 9 communicate with the ferric chloride filling layer 14.

The column body has a diameter of Φ60 mm, a height of 1500 mm, using the material of 316L stainless steel. A mixture of 50% by volume of quartz sand (an average particle size of about 3 mm) and 50% ferric chloride powder is used as the solid filling layer. The bulk density of the mixture was about 1500 kg/m$^3$ and the height of the packed bed of solid filling layer is about 500 mm. The gas inlet temperature is room temperature, and the temperature of gas stream leaving the outlet gas of the reaction column is maintained between 65° C. to 95° C. by electric heating the outer wall of the reaction column (the mixture of ferric chloride powder and the quartz sand is not preheated before being added into the column), and the gas flow rate is about 0.5 m$^3$/h with a gas residence time of about 15 s-25 s in the reaction column. Other conditions are the same as in Example 1.

The treatment process is carried out by introducing the nitrogen oxide-containing gas stream from the gas inlet 1 to the ferric chloride filling layer 14 through gas flow distributor 2. In the ferric chloride filling layer 14, the gas-solid adsorption chemical reaction between NO$_x$ and ferric chloride takes place, and NO$_x$ in the gas stream is absorbed by the ferric chloride solid particles in the filling layer. The purified gas is then discharged from gas outlet 6, and the solid particles after the reaction can be periodically discharged from the solid particle discharge port 9.

When the initial concentration of nitrogen oxides (containing about 95% nitrogen oxide) in the gas stream is 500 ppm, it is measured that the lowest concentration of nitrogen oxides leaving the gas outlet is about 55 ppm. Since the amount of ferric chloride added to the fixed bed filling layer in the column is fixed, the removal of nitrogen oxides from the gas stream varies with the consumption of ferric chloride in the column, and the giving outlet concentration of nitrogen oxides is the value when the maximum removal is achieved.

It should be noted that the above embodiments are merely illustrative of the technical aspects of the present invention, and the scope of the present invention is not limited thereto. It will be apparent to those skilled in the art that the technical solutions recited in the embodiments may be modified within the spirit and principles of the present invention, or any equivalent of any of the technical features therein may be replaced, modified, changed and improved, are to be included within the scope of the present invention.

The invention claimed is:

1. A method for removing nitrogen oxides from a gas stream, comprising:
   Introducing a to-be treated gas stream into a gas-solid reaction column and introducing ferric chloride particles into the gas-solid reaction column; and
   the reaction temperature in said gas-solid reaction column being in the range of 35° C. to 95° C.; and
   forming solid products of reaction between ferric chloride and nitrogen oxides, thereby purifying the gas stream.

2. A method according to claim 1, wherein said gas-solid reaction column is one of a fixed bed, a moving bed, a bubbled bed, a fluidized bed or a circulating fluidized bed reaction column.

3. A method according to claim 1, wherein a preheating temperature of the ferric chloride solid particles is 40° C. or above, when the temperature of said gas stream is lower than 35° C.

4. A method according to claim 1, wherein the gas-solid reaction column comprises a mixture of quartz sand, ceramic or zeolite particulate fillers and ferric chloride powder, and the volume of said fillers account from 0 to a maximum value of 99%.

5. A method according to claim 1, wherein said nitrogen oxides comprise the mixture of nitric oxide and nitrogen dioxide, or nitric oxide.

6. A method according to claim 1, characterized in that said gas-solid reaction column comprises:
   a column body (4);
   a lower portion of said column body (4) includes a gas inlet (1);
   a middle of the column body (4) includes a solid particle port (3);
   a gas flow distributor (2) is disposed in the column body (4) above the gas inlet (1);
   an upper portion of the column body (4) includes a connecting pipe (5) communicated with a gas-solid separator (7);
   the upper portion of the gas-solid separator (7) includes a gas outlet (6);
   a lower portion of the gas-solid separator (7) includes a solid particle discharge port (9) and a solid particle return port (8);
   the solid particle return port (8) communicates with the column body (4); and
   the column body (4) includes an inspection port (10) and a bottom solid particle discharge port (11).

7. A method according to claim 1, wherein said gas-solid reaction column comprises:
   a column body (4);
   a lower portion of said column body (4) includes a gas inlet (1);
   an upper portion of said column body (4) includes a gas outlet (6) and a solid particle inlet (3)
   a solid particle discharge port (9) is disposed at a bottom of the column body (4);
   said gas inlet (1) is communicated with the gas outlet (6) through a gas-solid reaction zone (12); and
   the solid particle inlet (3) is communicated with the solid particle discharge port (9) through the gas-solid reaction zone (12) and the solid particle recovery zone (13).

8. A method according to claim 1, wherein said gas-solid reaction column comprises:
   a column body (4);
   a lower portion of said column body (4) including a gas inlet (1);
   a gas flow distributor (2) is arranged above the gas inlet (1) in the column body (4);
   a ferric chloride filling layer (14) is disposed above the gas flow distributor (2);
   a solid particle inlet (3) and a gas outlet (6) of said column body (4) are disposed above the ferric chloride filling layer (14);
   a solid particle discharge port (9) is disposed at a bottom of the column body (4);
   the column body further including an inspection port (10);
   said gas inlet (1) communicates with the gas outlet (6) through the gas distributor (2) and the void of the ferric chloride fill layer (14); and the solid particle inlet (3) and the solid particle discharge port (9) are communicated with the ferric chloride filling layer (14).

9. A method according to claim 1, wherein said solid products are coordination compounds or related salts.

10. A method according to claim 1, wherein the nitrogen oxides are released from the solid products by heating at the temperature of 105° C. or above under normal pressure, or dissolving in water.

\* \* \* \* \*